United States Patent [19]

Kuwako

[11] 4,352,036
[45] Sep. 28, 1982

[54] ELECTRICAL ROTARY MACHINE

[75] Inventor: Tomohisa Kuwako, Anjo, Japan

[73] Assignee: Kabushiki Kaisha Tokai Rika Denki Seisakusho, Aichi, Japan

[21] Appl. No.: 172,283

[22] Filed: Jul. 25, 1980

[30] Foreign Application Priority Data

Jul. 27, 1979 [JP] Japan .................. 54-103023[U]

[51] Int. Cl.³ .............................................. H02K 7/10
[52] U.S. Cl. ........................................ 310/83; 310/90
[58] Field of Search ............... 310/83, 162, 165, 154, 310/41

[56] References Cited

U.S. PATENT DOCUMENTS

| | | | |
|---|---|---|---|
| 3,231,770 | 1/1966 | Hyde | 310/162 X |
| 3,735,164 | 5/1973 | Linn et al. | 310/83 X |
| 3,898,488 | 8/1975 | Erwin et al. | 310/83 |

*Primary Examiner*—Donovan F. Duggan
*Attorney, Agent, or Firm*—Wenderoth, Lind & Ponack

[57] ABSTRACT

An improved electrical rotary machine which includes a stator having either one of a permanent magnet or pole teeth, a rotor having the other of the permanent magnet or pole teeth, a ring coil wound around a coil bobbin, a yoke which forms a magnetic circuit surrounding the ring coil together with the pole teeth, a bearing for supporting a rotor shaft of the rotor, a reduction mechanism further including gears engaging a gear secured to the rotor shaft, and a case for the reduction mechanism. The yoke is formed as one unit with the case for integral construction of the coil bobbin, bearing and case.

7 Claims, 4 Drawing Figures

ELECTRICAL ROTARY MACHINE

BACKGROUND OF THE INVENTION

The present invention generally relates to electrical machinery and more particularly, to a rotary electrical machine in which a reduction gear or reduction mechanism section is formed in one unit with a motor section.

As shown in FIG. 1, a conventional electrical rotary machine includes, for example, a reduction mechanism section A having gears 13, 15, 17, 20, etc. accommodated in a chamber constituted by a gear case 1 and a lid portion 2, and a motor section B having a rotary driving portion housed in another chamber formed by a motor case 3 and a lid portion 4. For assembly, the reduction mechanism section A and motor section B separately constituted are combined and to each other by screws 24 and the like. A rotor 6 having pole teeth and disposed to confront a magnetized face of a circular permanent magnet member 5 secured to the lid portion 4, is fixed to a rotor shaft 8 through a rotor boss portion 7. Within the motor case 3, there are fixedly disposed a coil bobbin 11 having a coil 23 wound therearound, a yoke member 10, and a rotor bearing 9 in which the rotor shaft 8 is rotatably fitted. The rotor bearing 9 is in contact with the gear 13 secured to the rotary shaft 8 through balls 12 provided at one end portion of said rotor bearing 9. Accordingly, the rotation of the gear 13 is transmitted to an external appliance (not shown) via the gear 15, supported by a shaft 14, gear 17 supported by a shaft 16 which are provided in the gear case 1, and gears 20 and 22, etc. respectively supported by a shaft 19 mounted on the case 1 and lid portion 2 in bearings 18 and 21.

In the conventional rotary machine as described above, since the reduction mechanism section A and motor section B are separate elements combined into one unit by screws and the like as described earlier, it has been unavoidable that the number of parts, time required for the assembly, manufacturing cost, etc., are undesirably increased.

SUMMARY OF THE INVENTION

Accordingly, an essential object of the present invention is to provide an improved electrical rotary machine in which the number of parts and assembly time are reduced, with consequent reduction in the manufacturing cost.

Another important object of the present invention is to provide an improved electrical rotary machine of the above described type which has simple construction and functions stably and with high reliability.

In accomplishing these and other objects, according to one preferred embodiment of the present invention, there is provided an electrical rotary machine which comprises a first case having a lid and having integral with the first case and forming one unit therewith a coil bobbin, a rotor bearing, shaft mounting portions for shafts for corresponding gears, a rotor shaft receiving bore, a recess for receiving a rotor boss portion, and a yoke member, a second case in which a permanent magnet member is positioned as a stator, a thrust bearing provided at a central portion of the stator, the thrust bearing having balls contacting a rotor having pole teeth and with the rotor boss portion being secured to a rotor shaft received in the rotor shaft receiving bore together with the rotor, a ring coil wound around the coil bobbin and surrounded by a magnetic circuit including the yoke, rotor boss portion, rotor and second case so that magnetic flux produced during energization of said ring coil passes through the magnetic circuit in a predetermined direction according to the direction of electric current, and a gear secured to the rotor shaft for transmission of rotation of the rotor shaft to an output shaft through intermediate gears.

By the arrangement according to the present invention as described above, an improved electrical rotary machine has been advantageously provided which has a reduced number of parts, and reduced assembly time and manufacturing cost.

BRIEF DESCRIPTION OF THE DRAWINGS

These and other objects and features of the present invention will become apparent from the following description of a preferred embodiment thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
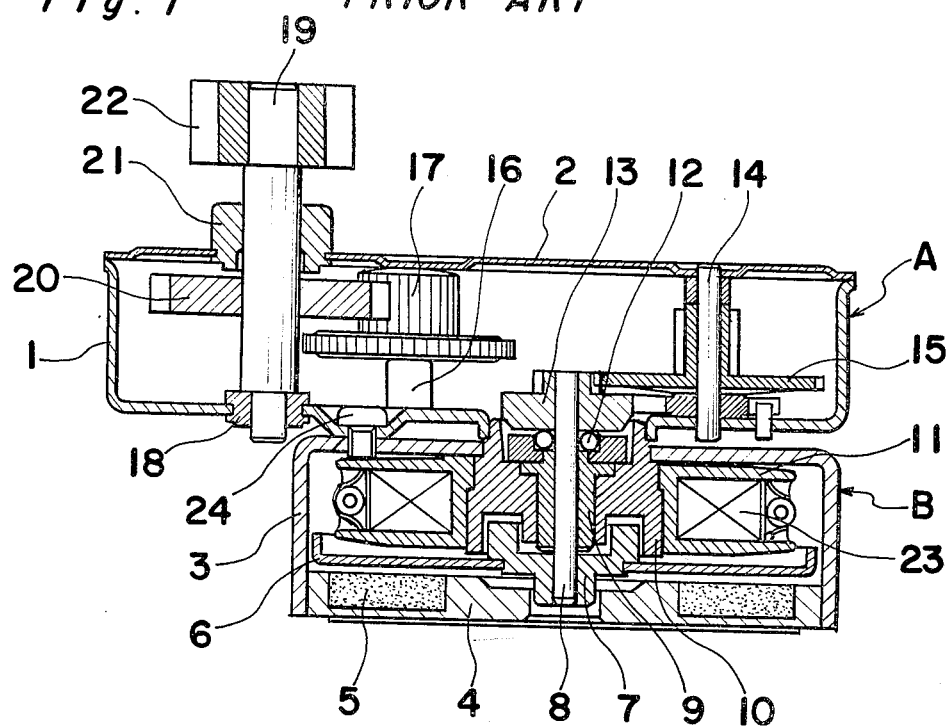
FIG. 1 is a schematic side sectional view of a conventional electrical rotary machine (already described)
Figure 2:
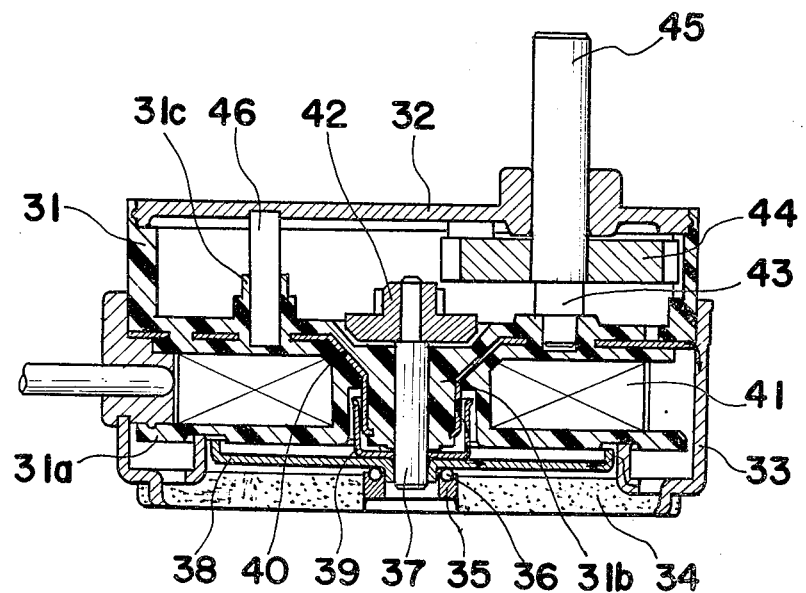
FIG. 2 is a schematic side sectional view of an improved electrical rotary machine according to one preferred embodiment of the present invention.
Figure 3:
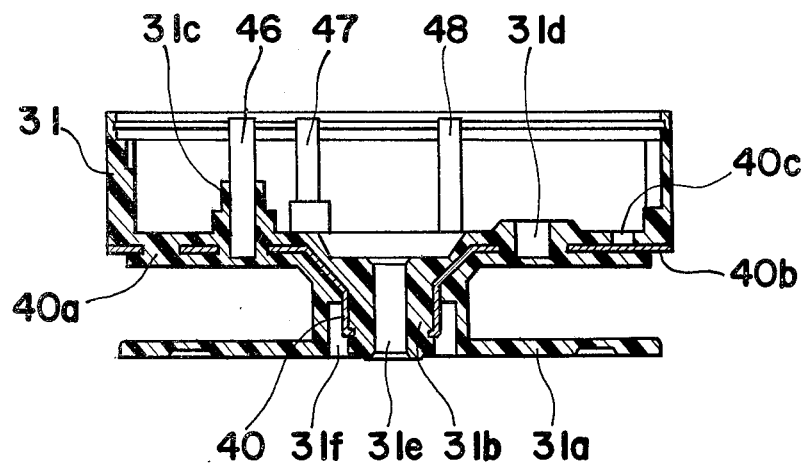
FIG. 3 is a schematic side sectional view showing the integral structure of a gear case and a yoke employed in the arrangement of FIG. 2.
Figure 4:
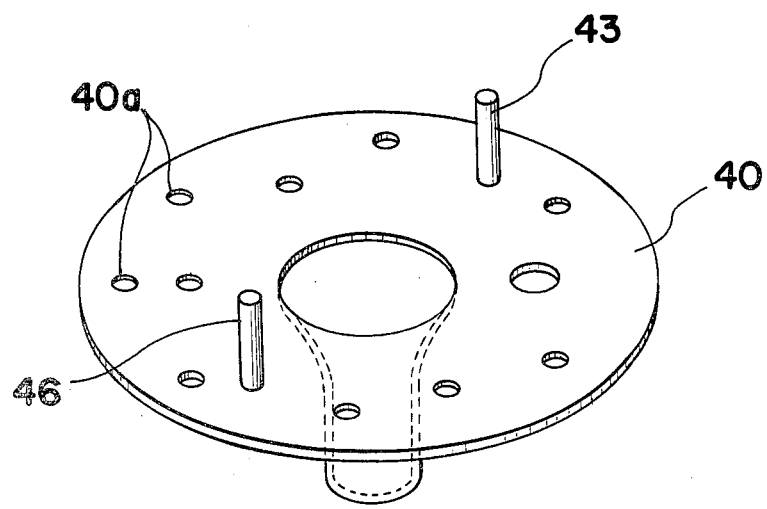
FIG. 4 is a perspective view of the yoke employed in the arrangement of FIG. 2.

Referring now to the drawings, there is shown in FIGS. 2 and 3 an improved electrical rotary machine according to one preferred embodiment of the present invention which generally includes a gear case 31 for a reduction mechanism having integral therewith and forming one unit therewith a yoke member 40, and another case 33 for a motor section which are constructed in a manner as described hereinbelow.

The gear case 31 is made of synthetic resin such as Lighton (name used in trade and manufactured by Phillips Petroleum, U.S.A.) and has integrally formed therewith a coil bobbin 31a, a rotor bearing 31b, a shaft fixing portion 31c for a shaft 46, etc. (the height for mounting a gear may be adjusted by adjusting the height of the step portion thereof), a shaft fixing portion 31d for a shaft 43, a rotor shaft bore 31e, a recess 31f for receiving a rotor boss portion 39, etc. for example, by molding (FIG. 3). The yoke member 40 made of soft magnetizable material and having a disc-like configuration has a plurality of openings 40a in its surface, and a peripheral edge around the central opening thereof extends downward to concentrically surround the rotor bearing 31b as shown. In the manufacture, the yoke member 40 is held at its exposed portions 40b and 40c by predetermined portions of a metal mold (not shown), and is integrally molded into the gear case 31 by pouring synthetic resin in a molten state into the metal mold for solidification. It is to be noted that the above mentioned openings 40a formed in the yoke member 40 are effective for facilitating pouring of the molten synthetic resin around the yoke member and also for achieving rigid fixing of the yoke member 40 by the synthetic resin upon hardening thereof. For covering the upper portion of the gear case 31, a lid member 32 is provided.

In the bottom of the motor case 33 made of soft magnetizable material, there is disposed a permanent magnet which functions as a stator 34 which is made, for example, by molding a mixture of barium ferrite in a powder form with polyamide resin. At the central portion of the stator 34, a thrust bearing 35 is provided, the balls 36 thereof made of hard material being held in contact with a rotor 38 made of soft magnetizable material and having pole teeth. The rotor 38 is secured to a rotor shaft 37 together with the rotor boss portion 39 of soft magnetizable material. A ring coil 41 wound around the coil bobbin 31a is surrounded by a magnetic circuit so that magnetic flux produced upon energization thereof passes through the magnetic circuit formed by the yoke member 40, rotor boss portion 39, rotor 38 and motor case 33 in the direction indicated by the arrows and according to the direction of currents. To the rotor shaft 37, there is fixed a gear 42 for transmitting the rotation of the shaft 37 to an output shaft 45 through a gear 44, etc. Depending on necessity, shafts 46, 47 and 48, etc. for gears (not shown) are provided in the gear case 31.

The electrical rotary machine according to the present invention as described in the foregoing may readily be assembled by mounting the gear case 31 having the yoke member 40 onto the motor case 33, inserting the rotor shaft 37 to which the rotor 38 and rotor boss portion 39 are fixed, into the bearing 31b, mounting the stator 34 with the thrust bearing 35 attached in the motor case 33, mounting the gears 42, 44, etc. on the corresponding shafts 37 and 43, and finally attaching the lid 32 onto the gear case 31.

By the above arrangement, when AC current is applied to the coil 41, AC flux flows through the magnetic circuit including the yoke member 40, motor case 33, rotor 38, and rotor boss portion 39, and magnetic poles N and S are produced in the pole teeth provided on the rotor 38 to confront the magnetized face of the stator, i.e. permanent magnet 34. The magnetic poles thus developed repel or attract corresponding N and S poles of the stator 34, and consequently, the rotor 38 is rotated in synchronization with the frequency of the AC current, while the rotation thereof is transmitted to the output shaft 45 through the gears 42, 44, etc.

As is clear from the foregoing description, according to the arrangement of the present invention, since the gear case, coil bobbin, shaft fixing portion, spacer for adjusting the height for mounting the gears, etc. are integrally formed, the number of parts involved is decreased, the man-hours required for the assembly is also reduced by forming the yoke member as one unit with the gear case during molding of the latter, with consequent reduction of manufacturing cost, and thus, in cooperation with the reduction of expenses of production facilities for pressure insertion of shafts, caulking, etc. and also of metal molds for processing of parts, it has been made possible to provide an improved electrical rotary machine which functions with a high reliability at low cost.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electrical rotary apparatus which comprises:
    a motor case of magnetic material;
    a stator member forming part of said case;
    a rotor member within said case, one of said members having a permanent magnet and the other member being of a magnetic material;
    a rotor shaft on which said rotor member is mounted;
    a bearing of a synthetic resin material in which said rotor shaft is supported;
    a coil bobbin of synthetic resin material around said shaft and on the opposite side of said rotor from said stator;
    a ring coil wound around said coil bobbin;
    a yoke member of magnetic material extending parallel with said rotor shaft from said rotor and then radially outwardly on the opposite side of said bobbin coil from said rotor;
    a reduction mechanism including reduction gears and a further gear secured to said rotor shaft at a point spaced along said shaft from said rotor and on the opposite side of said bearing from said rotor and engaged with said reduction gears;
    and
    a gear case of synthetic resin material for said reduction gears and having a radially extending wall within which said radially extending part of said yoke is embedded; said gear case, said coil bobbin and said bearing being integrally molded and said gear case being fitted into said motor case for securing said motor case to said gear case and with the outer periphery of said yoke contacting said motor casing.

2. An apparatus as claimed in claim 1 further comprising at least one spacer of synthetic resin molded integrally with said radially extending wall and extending into said gear casing and having a gear shaft receiving recess therein.

3. An apparatus as claimed in claim 1, wherein said yoke has a plurality of openings therein through which the synthetic resin extends for rigidly securing said yoke to said gear case.

4. An apparatus as claimed in claim 1, wherein said motor case is made of soft magnetizable material.

5. An apparatus as claimed in claim 1, wherein said permanent magnet is on the stator and is a mixture of barium ferrite in powder form molded with polyamide resin.

6. An apparatus as claimed in claim 1 in which said integrally molded gear case, coil bobbin and bearing has a recess therein at the end toward said rotor and in which said yoke is exposed, and a rotor boss on said rotor extending into said recess and engaged with said yoke.

7. An apparatus as claimed in claim 1 further comprising a thrust bearing at a central portion of said stator, said thrust bearing having rolling bearing elements contacting said rotor, and a rotor boss on which said rotor is mounted and being secured to said rotor shaft.

* * * * *